(12) United States Patent
Boutant

(10) Patent No.: US 7,995,140 B2
(45) Date of Patent: Aug. 9, 2011

(54) ADD-ON FOR A COMMUNICATING TERMINAL COMPRISING IMAGING MEANS AND ASSEMBLY COMPRISING THE ADD-ON AND THE COMMUNICATING TERMINAL

(75) Inventor: Yann Boutant, Chindrieux (FR)

(73) Assignee: Signoptic Technologies, Le Bourget du Lac (FR)

( * ) Notice: Subject to any disclaimer, the term of this patent is extended or adjusted under 35 U.S.C. 154(b) by 769 days.

(21) Appl. No.: 11/987,866

(22) Filed: Dec. 5, 2007

(65) Prior Publication Data

US 2009/0318186 A1    Dec. 24, 2009

Related U.S. Application Data

(60) Provisional application No. 60/873,016, filed on Dec. 6, 2006.

(51) Int. Cl.
*H04N 5/225*    (2006.01)
*H04M 1/00*    (2006.01)

(52) U.S. Cl. ....... 348/375; 348/75; 348/376; 455/556.1; 455/575.1

(58) Field of Classification Search .................. 348/375; 455/556.1
See application file for complete search history.

(56) References Cited

U.S. PATENT DOCUMENTS

| | | | | |
|---|---|---|---|---|
| 5,142,299 A | * | 8/1992 | Braun | 396/28 |
| 5,781,807 A | * | 7/1998 | Glassgold et al. | 396/71 |
| 5,956,536 A | * | 9/1999 | Dow et al. | 396/164 |
| 6,052,534 A | * | 4/2000 | Goto | 396/71 |
| 6,898,301 B2 | * | 5/2005 | Iwanaga | 382/124 |
| 7,106,357 B2 | * | 9/2006 | Fukuda et al. | 348/14.02 |
| 7,274,808 B2 | * | 9/2007 | Baharav et al. | 382/124 |
| 7,364,077 B2 | * | 4/2008 | Wolf, II | 235/454 |
| 7,764,320 B1 | * | 7/2010 | Salvato | 348/344 |
| 2003/0036365 A1 | | 2/2003 | Kuroda | |
| 2003/0118340 A1 | | 6/2003 | Horiguchi | |
| 2003/0164895 A1 | * | 9/2003 | Viinikanoja et al. | 348/375 |
| 2006/0125929 A1 | | 6/2006 | Choi | |

FOREIGN PATENT DOCUMENTS

| | | |
|---|---|---|
| EP | 1 276 309 | 1/2003 |
| FR | 2 866 139 | 8/2005 |
| FR | 2 870 376 | 11/2005 |
| JP | 2004-120340 | 4/2004 |
| WO | WO 2005/078651 | 2/2005 |

* cited by examiner

*Primary Examiner* — Ngoc-Yen T Vu
(74) *Attorney, Agent, or Firm* — Clark & Brody

(57) ABSTRACT

An accessory for a portable communicating terminal (T) fitted out with means (C) for processing and acquiring images through at least one optical system (O), an accessory comprising:
  means (4) for attachment onto the communicating terminal (T),
  an acquisition window (5) intended to be placed in relationship with the optical system (O) of the communicating terminal (T),
  illumination means (10) adapted for illuminating an acquisition region included in the field of acquisition of the optical system through the acquisition window (5),
  means (12) for powering the illumination means,
  and means (14) for controlling the illumination means.

15 Claims, 2 Drawing Sheets

ADD-ON FOR A COMMUNICATING TERMINAL COMPRISING IMAGING MEANS AND ASSEMBLY COMPRISING THE ADD-ON AND THE COMMUNICATING TERMINAL

This application claims the benefit of U.S. Provisional Application No. 60/873,016 filed Dec. 6, 2006.

BACKGROUND OF THE INVENTION

1. Field of the Invention

The present invention relates to the technical field of accessories intended to be fitted on portable communicating terminals in order to make them suitable for applying specific functions.

More particularly, the present invention relates to the accessories intended to be used in combination with portable communicating terminals fitted out with means for processing and acquiring images such as for example smart telephones, called <<smartphones>>, equipped with movie or still cameras or even personal electronic assistants, called <<PDAs>>, also fitted out with movie or still cameras.

2. Description of the Prior Art

Such portable communication terminals are relatively inexpensive means for acquiring images which are generally considered as being of medium quality, or of even low quality, because of the resolution of the sensors used. However, in spite of this low quality reputation of the images obtained with the movie or still cameras integrated into mobile telephones or personal digital assistants, the merit of the inventors was to demonstrate that it was possible to obtain with these devices, images of sufficient quality in order to allow an analysis of the microscopic or submillimeter geometrical structure of materials or different products in order to be notably able to apply methods for extracting signatures or physical characteristics and methods for applying these signatures as described for example in the patent applications FR2866139, WO200578651, US20052622350, FR2870376.

However, the still or movie cameras fitting out smart telephones or personal electronic assistants are generally designed for making portraits, photographs of landscapes or even photographs indoors, so that their optical system has a set focal distance with which good focusing may be obtained for distances of the order of one meter or larger than one meter. Now, such a focal distance is unsuitable for close shots or so-called macroscopic shots.

Moreover, smart telephones or personal digital assistants fitted out with still cameras only very rarely comprise light sources adapted to photography and assuming that they are fitted out with them, these light sources consist of flashes adapted for illuminating relatively remote and totally unsuitable scenes for close shots.

Thus, there has appeared the need of means for easily making smart telephones or digital assistants fitted out with image-shooting systems, movie or still cameras, usable for obtaining images of microscopic or submillimeter details of various products.

BRIEF SUMMARY OF THE INVENTION

In order to achieve this goal, the invention relates to an accessory for a portable communicating terminal fitted out with means for processing and acquiring images through at least one optical system, an accessory comprising:

means for attachment onto the communicating terminal, an acquisition window intended to be placed in a relationship with the optical system of the communicating terminal, suitable illuminating means for illuminating an acquisition region included within the field of acquisition of the optical system through the acquisition window, means for powering the illuminating means, and means for controlling the illumination means.

By applying such an accessory, in combination with the portable communicating terminal, it is possible de produce a suitable device in a simple way, in order to provide acquisitions of images, objects or subjects located in close proximity to the optical system and in the area covered by the illumination means.

According to an embodiment feature of the accessory according to the invention, the means for powering the illuminating means comprise at least one accumulator and/or one electric battery. With this feature, it is possible to give a certain autonomy to the accessory which may then illuminate subjects which are to be subject to an acquisition without providing external power to the accessory and to thereby notably avoid having to pick up power on the battery of the communicating terminal.

According to another feature of the invention, the accessory comprises optical adjustment means intended to cooperate with the optical system of the communicating terminal. Application of such optical adjustment means may notably prove to be necessary when the optical system of the communicating terminal is not adapted so as to provide focusing at a lower reduced distance, for example 100 mm.

According to the invention, the optical adjustment means then have a set or variable focal distance. In the case of optical adjustment means with a variable focal distance, the optical adjustment means may comprise a lens with a variable focal length, for example as developed and marketed by Varioptic in the case of a lens without any mobile mechanical part or by PGS in the case of a lens with mechanical stress.

In the case when the optical adjustment means have a variable focal distance, the adjustment of the focal distance may either be performed once and for all in the workshop for example before marketing the accessory, or on the contrary be performed during use at each image shot for example. In the latter case, the accessory according to the invention may be fitted out with means for automatically adjusting of the focal distance. In an alternative embodiment, the adjustment of the focal distance will be controlled by the portable communicating terminal fitted onto the accessory according to the invention.

According to still another feature of the invention which aims at facilitating the acquisition operation with which a fixed distance between the subject and the optical system may be obtained during the whole acquisition sequence, the accessory comprises means for pressing onto a subject which has to be the object of an acquisition through the acquisition window. The pressing means may then have a fixed position or on the contrary an adjustable position allowing the distance between the optical system of the portable communicating terminal and the subject to be adjusted.

According to another feature of the invention, the acquisition window is delimited by an acquisition tube or channel, a first end of which is intended to be placed in a relationship with the optical system and the second end of which is intended to be placed in a relationship with a subject which should be the object of an acquisition. With such an embodiment of the acquisition window, it is possible to define with the tube, one end of which is in a relationship with the optical system of the communicating terminal and the other one with the subject or the portion of the subject to be photographed or filmed, a sort of acquisition chamber providing better control of the illumination of the area of the subject which is to be the object of the acquisition. According to the invention, this illumination chamber is not necessarily sealed from external light, although it is also possible to provide means with which such a seal may be obtained, such as for example a gasket system which will press against the communicating terminal around its optical system on the one hand and a lip or a gasket intended to press against the surface of the subject on the other hand.

According to a feature of the invention, the second end of the acquisition tube or channel is associated with means for pressing on the subject, these pressing means either providing or not a lightproof seal as this was stated above.

The illumination means fitting out the accessory according to the invention may be made in any suitable way. Thus, the illumination means may emit light, for example point-like, diffuse light, or even simulate an annular light source. The illumination means may also emit light rays along different incidences or a combination of incidences.

According to a feature of the invention, the illumination means are adapted in order to emit light rays towards the acquisition window and the accessory comprises means for interposing a subject which is to be the object of an acquisition, between the illumination means and the acquisition window.

According to another feature of the invention, the illumination means comprise at least one light source and means for guiding or diffusing the light emitted by the light source. The means for guiding the light may then be adapted so as to emit light rays illuminating the acquisition region along a direction substantially parallel to an optical or focal axis of the optical system of the communicating terminal.

The means for guiding the light may also be adapted so as to emit light rays illuminating the acquisition region along an oblique direction or perpendicular to an optical or focal axis of the optical system of the communicating terminal.

Moreover, the light used for providing the illumination of the subject may be of different natures. Thus, according to a feature of the invention, the illumination means comprise at least one light source or a combination of light sources selected from:
  ultraviolet sources,
  infrared sources,
  white light sources,
  colored visible light sources.

According to the invention, the light emitted by the illumination means may be coherent of the laser type, for example, or incoherent of the white light type for example, depending on the contemplated applications. Of course, the illumination means upon demand from the user or depending on controls received from the portable communicating terminal, may be adapted for emitting either coherent light or incoherent light or even to operate simultaneously as an incoherent light source, and an incoherent light source may for example have different wavelengths.

According to another feature of the invention, the accessory comprises at least one interface for connection to the communicating terminal. Such a connection interface may for example be used so that the battery possibly fitting out the accessory according to the invention may power the portable communicating terminal. This interface may also be used in order to allow the communicating terminal to control the operation of the illumination means or further the focusing provided by the optical adaptation means of the accessory.

Still according to a feature of the invention, the accessory comprises means for communicating with the portable communicating terminal. These communication means may then be optical, by wire or by radio. Like the connection interface, the communication means may be used in order to notably allow the communicating terminal to control the operation of the illumination means or further the focusing provided by the optical adaptation means of the accessory.

The invention also relates to an assembly which comprises a portable communicating terminal fitted out with means for processing and acquiring images through at least one optical system, as well as an accessory according to the invention attached onto the communicating terminal so that the acquisition window is positioned in relationship with the optical system of the communicating terminal.

According to a feature of the invention, this assembly is adapted so as to provide reading of markings on a subject and/or for providing acquisition of submillimeter physical and/or geometrical features of this subject placed at a distance from the optical system, of less than 50 mm and preferably less than 30 mm. According to another feature of the invention, the assembly is adapted so as to provide reading of a marking on a subject and/or acquisition of physical and/or geometrical features of this subject placed at a distance from the optical system of less than 20 mm and preferably between 5 mm and 20 mm.

According to the invention, the term "marking" notably designates one or more signs printed on a subject such as for example a one-dimensional bar code, or a two-dimensional code such as a code of the datamatrix type. The term "marking" also designates one or more signs capable of being made at the surface or in the depth on a subject by various techniques such as for example etching or micro-etching, embossing, microperforation.

Of course, the different aforementioned features of the invention may be applied with each other according to different combinations when they are not incompatible with or exclusive from each other.

Moreover, various other characteristics of the invention will become apparent from the description made below, with reference to the appended drawings which show, as non-limiting examples, embodiments of the object of the invention.

BRIEF DESCRIPTION OF THE DRAWING(S)

DETAILED DESCRIPTION OF THE PREFERRED EMBODIMENTS

Figure 1:
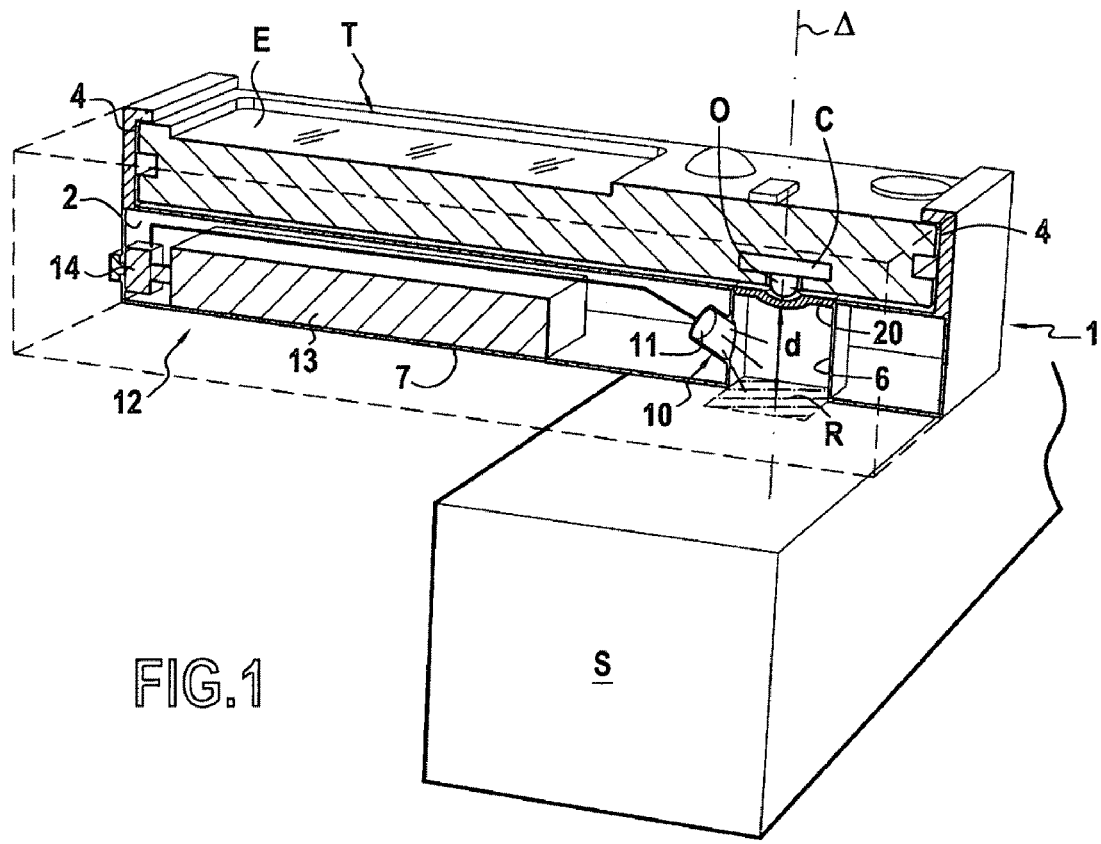
FIG. 1 is a schematic perspective view partly cut away from an assembly comprising an accessory according to the invention and a portable communicating terminal which is fitted out with means for processing and acquiring images through at least one optical system and which is fitted onto the accessory according to the invention.

An accessory, according to the invention, such as schematically illustrated in FIG. 1 and designated on the whole by reference 1, is intended to be used in association with a portable communicating terminal T fitted out with means for processing and acquiring images C through an optical system O. The means for processing and acquiring images C comprise for example one or more sensors of the CCD, CMOS type or the like connected to the processing and/or computing unit.

In the sense of the invention, a portable communicating terminal fitted out with means for processing and acquiring images notably corresponds to a smart telephone integrating a still or movie camera or even a personal digital assistant also integrating a still or movie camera.

Figure 2:
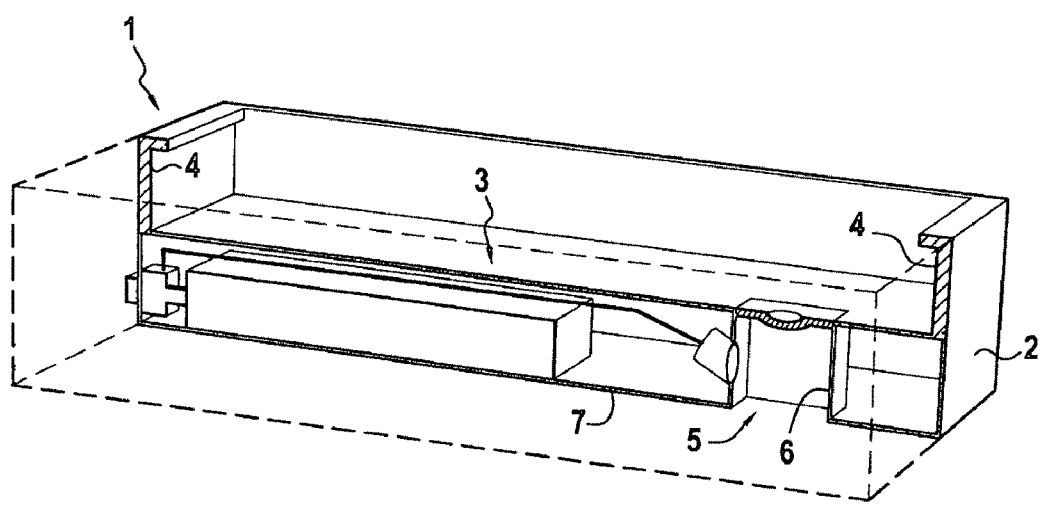
FIG. 2 is a schematic perspective view partly cut away from the accessory, illustrated in FIG. 1, alone.

The accessory 1 according to the invention comprises a body 2 which comprises, according to the illustrated example and as this is more particularly apparent from FIG. 2, a face for receiving 3 the portable communicating terminal T. The receiving face 3 is then associated with means 4 for attachment of the body 2 onto the terminal T. According to the invention, the attachment means 4 may be made in any suitable way and, according to the illustrated example, attachment means 4 are formed by curved rigid tabs which define in a relationship with the body 2 and its receiving face 3, a housing for receiving the terminal T.

In order to allow application of image acquisition means C of the terminal T, an acquisition window 5 is provided in the body 2 and placed so as to be facing the optical system O of the terminal T when the accessory 1 is attached on the latter as shown by FIG. 1. According to the illustrated example, the acquisition window 5 is delimited by an acquisition tube or channel 6 provided in the body 2 and emerging at a face 7 of the body 2 opposite to the receiving face 3. The face 7 then forms a means for pressing on a subject S such as for example a product which is to be the object of an authentication operation.

The accessory 1 further comprises adapted illumination means 10 so as to illuminate an acquisition region R included in the acquisition field of the optical system O through the acquisition window 5. The illumination means 10 may be made in any suitable way and for example comprise at least one light source 11 which, according to the example, is placed at one of the walls of the acquisition channel 6 so as to emit light rays 15 which have an oblique direction or perpendicular to the optical axis Δ of the optical system O. The nature of the light emitted by the smooth source will be selected depending on the application, thus the use of a light source for example selected from:
- ultraviolet sources,
- infrared sources,
- white light sources,
- colored visible light sources, may be contemplated The light source may also emit coherent light or incoherent light as selected depending on the applications. As a light source, the use of a laser may also be contemplated.

The power required for operating the illuminating means 10 is provided by power supply means 12 which will advantageously comprise at least one electric accumulator 13, preferably a rechargeable accumulator.

The accessory according to the invention also comprises means 14 for controlling the illuminating means 10.

The thereby formed accessory according to the invention is therefore intended to be fitted on the portable communicating terminal T so as to form an assembly particularly suitable for close image shots of at least a portion of the surface of the subject S. For this purpose, the aperture of the acquisition channel 6 located at the face 7 is placed in contact with the subject S. The body 2 and the channel 6 are then designed so that the distance d between the optical system O and the subject S is less than 50 mm and preferably less than 30 mm. In a more particularly preferred embodiment, the pressing means formed by the face 7 are designed so that the distance is less than 20 mm and preferably between 5 mm and 20 mm.

If the optical system O fitting out the terminal T is not adapted so as to allow focusing at such a reduced distance, the accessory according to the invention will then comprise optical adjustment means 20 intended to cooperate with the optical system O so that the image processing and acquisition C may obtain at least one image of the surface of the subject S.

The optical adjustment means 20 may be made in any suitable way and for example comprise a lens of set focal length correcting the minimum focusing distance of the optical system O. Of course, the adjustment means 20 may also comprise a set of lenses in order to form either a system with a set focal distance or a system with a variable focal length.

When an image needs to be made of the surface of the subject S, the user switches on the illuminating means 10 via control means 14. The user may then trigger at the terminal T a sequence for acquiring or taking shots. It should be noted that the acquisition channel 6 then forms in combination with terminal T and the subject S a sort of acquisition chamber allowing optimum illumination conditions by the means 10 for illuminating the surface of the subject S to the extent that even if the acquisition chamber is not perfectly sealed to external light, it limits the perturbations therefrom.

Figure 3:
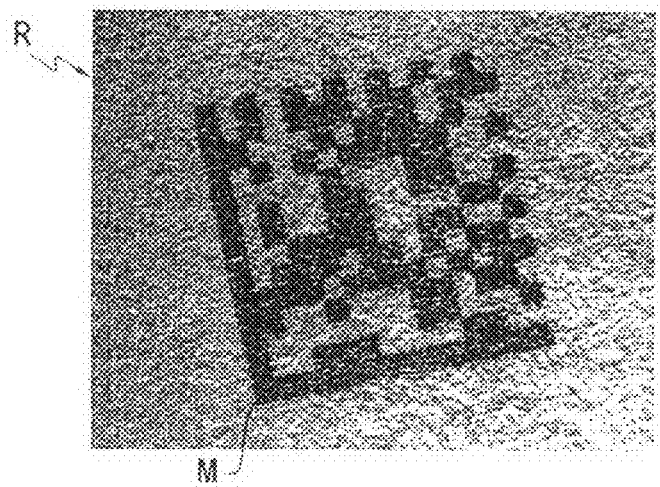
FIG. 3 is an example of a highly enlarged image from an acquisition of a region of a subject comprising a marking made on a fiber support such as paper or cardboard, this acquisition having been carried out by means of an assembly, as illustrated in FIG. 1, comprising an accessory according to the invention and a portable communicating terminal.

The screen E of the terminal T may be used for previewing the region observable by the acquisition means C so as to place the window 6 in relationship with the region of interest R which may for example comprise a marking M printed on a fiber support as this is illustrated in FIG. 3.

According to the contemplated applications, the terminal T may be adapted for example in order to provide certain or the whole of the following operations after acquisition or shooting.

The terminal T may for example decode the marking M in order to extract information from it which may be used in a subsequent process. The accessory 1/terminal T assembly according to the invention having a certain capability of magnifying the marking M, may then be made so as to be included in a square with a side less than 10 mm or even 5 mm so that it is impossible to distinguish with the naked eye, and at a distance of about 30 cm, the black areas from the white areas which compose it. The information of the marking M may then be used for comparison with information from a database recorded in the terminal T for example in order to proceed with an identification or establishment of a relationship.

If the terminal T integrates the functionalities for communication and connection to a communications network and to an external computer system, the information from the marking M may be transmitted via the network to the external computer system. It is also possible to send via the network, the acquired raw image, without any prior processing aiming at extracting information or a signature from it, to the external computer system.

If the terminal T integrates GPS and/or time stamping type localization functionalities, the raw acquisition and/or the information extracted from the acquisition may be associated with the geographical coordinates or the acquisition location and/or with the acquisition date and time.

Within the scope of an application aiming at providing authentication of objects, the terminal T may for example be adapted in order to extract from the acquisition both information contained in the marking and a digital signature from the material bearing the marking. The information and the signature may then be compared with information and signatures stored in a database recorded in the terminal T or in a remote database. The present signatures in such databases may then have been extracted either by a system distinct from the accessory/terminal assembly according to the invention such as an industrial system, or on the contrary by an analogous system or by a system identical to the assembly according to the invention or even by the same assembly.

Within the scope of certain applications, the accessory/terminal assembly may be used for extracting from a given subject a digital signature related to the random character of the geometry of its structure observed at submillimeter scale. This signature may then be transmitted to an external system which may identify the subject when the latter will be presented to it by for example comparing the received signature with a new extracted signature.

Within the scope of an authentication application, for example involving a marking containing information coded by means of an encryption key formed by a digital signature extracted from the structure of the support of the marking, the accessory/terminal assembly may be adapted in order to provide by itself, reading of the marking, extraction of the signature from the support and decoding of the information of the marking by means of the key formed by the digital signature. The nature of the decoded information will then certify the authenticity of the support.

Of course, the accessory/terminal assembly according to the invention may also be adapted so as to provide all or part of the processes or operations described in the applications FR 2 866 139, WO2005/78651, US20052622350, FR 2 870 376, FR 05 13231 and FR 06 01342 incorporated herein by reference.

Moreover, it is possible to contemplate various alternatives of the accessory depending on the use which will be made of the assembly formed by the accessory 1 and the portable communicating portable T which it fits out.

Figure 4:
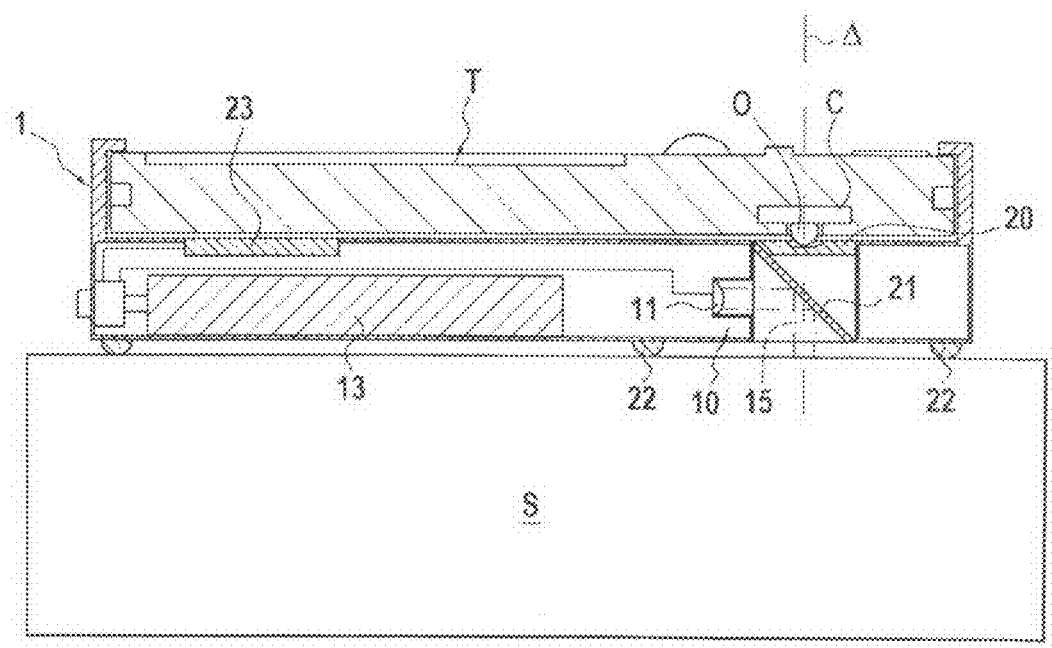
FIG. 4 is a longitudinal schematic sectional view showing an alternative embodiment of the accessory according to the invention in association with a portable communicating terminal.

Thus, FIG. 4 shows an alternative embodiment of the accessory 1 according to which the illumination means 10 comprise means 21 for guiding and diffusing light emitted by the light source 11. According to the illustrated example, the light guiding means comprise a semi-transparent mirror 21 placed so that the light rays 15 emitted by the source 11 arrive on the surface of the subject S with a direction substantially parallel to the axis Δ of the optical system O. According to this alternative embodiment, the accessory further comprises legs 22 as means pressing on the subject S. Further, in order to allow communication between the accessory 1 and the terminal T, the accessory is also fitted out with communication means 23 such as for example a WIFI or Bluetooth® radio communications interface. It may also be contemplated that the communications means 23 operate with infrared.

Figure 5:
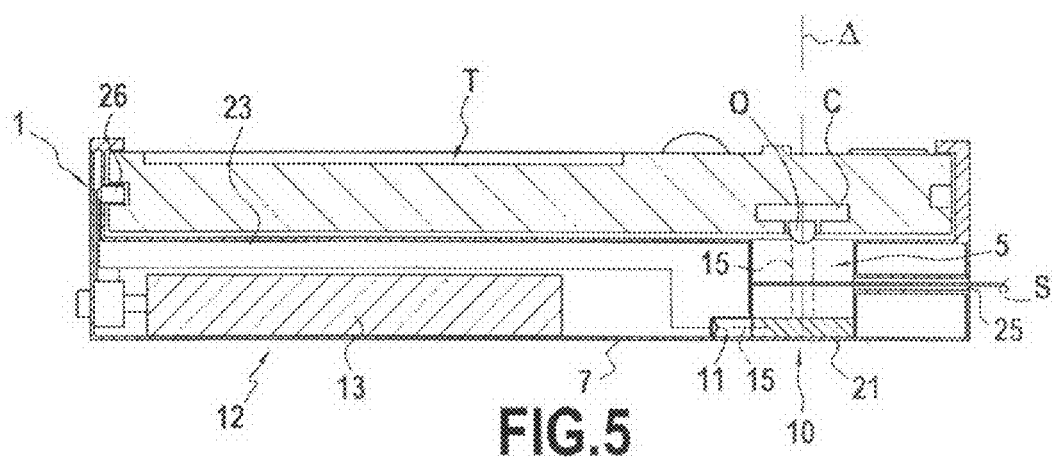
FIG. 5 is a schematic sectional view similar to FIG. 4 showing another alternative embodiment of the accessory according to the invention in association with a portable communicating terminal.

FIG. 5 illustrates another alternative embodiment of the accessory 1 according to which the illumination means 10 are adapted so as to emit light rays towards the acquisition window and more particularly towards the optical system O. For this purpose and, according to the illustrated example, the illumination means comprise suitable guiding means 21 in order to send back parallel to the axis Δ, and towards the optical system O, the light rays 15 emitted by the source 11 perpendicularly to the axis Δ. The accessory 1 then comprises means 25, such as for example, a hatch or a slot, for interposing a subject S between the illumination means 10 and the acquisition window or the optical system O. Such a configuration allows one to proceed with acquisition by transmission or transparence of the subject S which may for example be a sheet of paper.

According to this example, the accessory also comprises an interface 26 for connection to the communicating terminal T. This connection interface 26 may then have various functions and, for example, allow the accumulator 13 to power the communicating terminal T or, conversely allow the communicating terminal to power the illumination means 10. According to the alternative illustrated in FIG. 5, the accessory 1 does not comprise any optical adaptation means. However, the accessory 1 may be fitted out with the latter, and in the event of optical adaptation means with a variable focal length, the connection interface may be adapted so as to allow the terminal T to control the optical adaptation means so as to provide the required focusing for perfect acquisition.

Of course, various other modifications may be made to the accessory for a portable communicating terminal without departing from the scope of the present invention.

The invention claimed is:

1. An assembly comprising a portable communicating terminal equipped with means for processing and acquiring images through at least one optical system and an accessory fitted onto said portable communicating terminal, said accessory comprising:
   means for removable attachment of the accessory onto the communicating terminal;
   an acquisition window intended to be placed in relationship with the optical system of the communicating terminal, said acquisition window being positioned in a relationship with the optical system of the portable communicating terminal;
   illumination means adapted so as to illuminate an acquisition region included in the field of acquisition of the optical system through the acquisition window;
   means for powering the illumination means; and
   means for controlling the illumination means,
   wherein said accessory comprises optical adjustment means intended to cooperate with the optical system of said portable communicating terminal.

2. An assembly according to claim 1, wherein the means for powering the illumination means comprise at least one accumulator and/or one electric battery.

3. An assembly according to claim 1, wherein the optical adjustment means of said accessory have a variable focal distance.

4. An assembly according to claim 1, wherein the optical adjustment means of said accessory comprise a lens with a variable focal length.

5. An assembly according to claim 1, wherein said accessory comprises means for pressing on a subject which is to be the object of an acquisition through the acquisition window.

6. An assembly according to claim 1, wherein the acquisition window is delimited by an acquisition tube or channel, a first end of which is intended to be placed in relationship with the optical system and a second end of which is intended to be placed in relationship with a subject which is to be the object of an acquisition.

7. An assembly according to claim 6, wherein said accessory comprises means for pressing on a subject which is to be the object of an acquisition through the acquisition window and the second end of said acquisition tube or channel is associated with the means for pressing on the subject.

8. An assembly according to claim 1, wherein the illumination means of said accessory are adapted so as to emit light rays towards the acquisition window and comprises means for interposing a subject which is to be the object of an acquisition between the illumination means and the acquisition window.

9. An assembly according to claim 1, wherein the illumination means of said accessory comprise at least one light source and means for guiding or diffusing light emitted by the light source.

10. An assembly according claim 1, wherein the means for guiding the light are adapted so as to emit light rays illuminating the acquisition region along a direction substantially parallel to an optical $\Delta$ or a focal axis of the optical system of the communicating terminal.

11. An assembly according to claim 1, wherein the means for guiding the light are adapted so as to emit light rays illuminating the acquisition region along a direction oblique or perpendicular to an optical axis $\Delta$ or a focal axis of the optical system (O) of the portable communicating terminal.

12. An assembly according to claim 1, wherein the illumination means of said accessory comprise at least one light source selected from:
ultraviolet sources;
infrared sources;
white light sources; and
colored visible light sources.

13. An assembly according to claim 1, wherein said assembly comprises at least one laser source or coherent light source.

14. An assembly according to claim 1, wherein said accessory comprises at least one interface for connection to the portable communicating terminal.

15. An assembly according to claim 1, adapted to provide reading of a marking and/or the acquisition of geometrical and/or physical features on a subject placed at a distance from the optical system, of less than 50 mm, and preferably less than 30 mm.

* * * * *